United States Patent
Yeh et al.

(10) Patent No.: US 9,123,279 B2
(45) Date of Patent: Sep. 1, 2015

(54) FLEXIBLE DISPLAY AND METHOD FOR CONTROLLING THE FLEXIBLE DISPLAY

(75) Inventors: Po-Chun Yeh, Tainan (TW); Heng-Yin Chen, Hsinchu County (TW); Yung-Hsiang Chiu, Miaoli County (TW); Wei-Yen Lee, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 482 days.

(21) Appl. No.: 13/434,875

(22) Filed: Mar. 30, 2012

(65) Prior Publication Data
US 2013/0162546 A1  Jun. 27, 2013

(30) Foreign Application Priority Data

Dec. 27, 2011  (TW) .............................. 100148934 A

(51) Int. Cl.
*G06F 3/01* (2006.01)
*G09G 5/08* (2006.01)
*G06F 3/02* (2006.01)
*G06F 3/041* (2006.01)

(52) U.S. Cl.
CPC ................ *G09G 5/08* (2013.01); *G06F 3/0221* (2013.01); *G06F 3/0414* (2013.01); *G06F 2203/04102* (2013.01); *G09G 2354/00* (2013.01); *G09G 2380/02* (2013.01); *G09G 2380/14* (2013.01)

(58) Field of Classification Search
CPC . G06F 3/041–3/0416; G06F 3/0488–3/04897; G06F 3/017; G06F 2203/04104; G06F 2203/04105; G06F 2203/04808

USPC .................................................. 345/163–169
See application file for complete search history.

(56) References Cited

U.S. PATENT DOCUMENTS

| 7,443,380 | B2 | 10/2008 | Nozawa | |
|---|---|---|---|---|
| RE40,891 | E | 9/2009 | Yasutake | |
| 7,683,890 | B2 | 3/2010 | Geaghan | |
| 2003/0227441 | A1* | 12/2003 | Hioki et al. | ................... 345/156 |
| 2009/0095540 | A1* | 4/2009 | Zachut et al. | .............. 178/18.03 |

(Continued)

FOREIGN PATENT DOCUMENTS

| CN | 1755603 | 4/2006 |
|---|---|---|
| CN | 101556524 | 10/2009 |

(Continued)

OTHER PUBLICATIONS

"Office Action of China Counterpart Application", issued on Sep. 3, 2014, p. 1-p. 5.

(Continued)

*Primary Examiner* — Sanghyuk Park
(74) *Attorney, Agent, or Firm* — Jianq Chyun IP Office

(57) ABSTRACT

A flexible display and a controlling method thereof are provided. The flexible display includes a plurality of pressure sensors, a display unit and a processing unit, wherein the processing unit is connected to the pressure sensors and the display unit. The processing unit obtains pressure values from each of the pressure sensors within a time unit and generates a pressure area and a pressure variance according to the pressure values from each of the pressure sensors. The processing unit further determines a display mode of the display unit according to the pressure area and the pressure variance. Therefore, the flexible display is capable of providing several kinds of display mode only based on the equipped pressure sensors.

10 Claims, 5 Drawing Sheets

(56) References Cited

U.S. PATENT DOCUMENTS

| | | |
|---|---|---|
| 2010/0053078 A1 | 3/2010 | Kim et al. |
| 2010/0141605 A1 | 6/2010 | Kang et al. |
| 2010/0277428 A1 | 11/2010 | Kumazawa |

FOREIGN PATENT DOCUMENTS

| | | |
|---|---|---|
| CN | 101677443 | 3/2010 |
| CN | 102087824 | 6/2011 |
| CN | 102141878 | 8/2011 |
| JP | 2003015795 | 1/2003 |
| TW | 399394 | 7/2000 |
| TW | 200846990 | 12/2008 |
| TW | 201027163 | 7/2010 |
| TW | 201044338 | 12/2010 |
| TW | 201102632 | 1/2011 |
| TW | 201142666 | 12/2011 |
| WO | 2006134552 | 12/2006 |

OTHER PUBLICATIONS

"Office Action of Taiwan Counterpart Application", issued on Sep. 26, 2014, p. 1-p. 6.

Zhou et al., "Design of Pressure Sensor Array with Reduced Number of Wires", Proceedings of the 2010 IEEE International Conference on Information and Automation, Jun. 20-23, 2010, p. 900-p. 905.

Someya et al., "Flexible, Large-area Sensors and Actuators with Organic transistor Integrated Circuits", IEIC Technical Report, Dec. 5, 2005, p. 49-p. 53.

Alzoubi et al., "Factor Effect Study for the High Cyclic Bending Fatigue of Thin Films on PET Substrate for Flexible Displays Applications", Journal of Display Technology, Jun. 2011, p. 348-p. 355.

Muraki et al., "Organic Semiconductor Based Strain Sensors for input system on flexible oleds", MEMS 2008, Jan. 13-17, 2008, p. 904-p. 907.

Chen et al., "Reliability of Flexible Display by Simulation and Strain Gauge Test", 2008 10th Electronics Packaging Technology Conference, Dec. 9, 2008, p. 322-p. 327.

Rey et al., "A high density capacitive pressure sensor array for fingerprint sensor application", 1997 International Conference on Solid-state Sensors and Actuators, Jun. 16-19, p. 1453-p. 1456.

* cited by examiner

FLEXIBLE DISPLAY AND METHOD FOR CONTROLLING THE FLEXIBLE DISPLAY

CROSS-REFERENCE TO RELATED APPLICATION

This application claims the priority benefit of Taiwan application serial no. 100148934, filed on Dec. 27, 2011. The entirety of the above-mentioned patent application is hereby incorporated by reference herein and made a part of this specification.

BACKGROUND OF THE DISCLOSURE

1. Field of the Disclosure

The disclosure relates to a flexible display and a controlling method thereof. Particularly, the disclosure relates to a flexible display capable of providing a plurality of display modes and a controlling method thereof.

2. Description of Related Art

Along with development of display technology, displays are developed to be thin and flat, and meanwhile weights and occupation spaces thereof are decreased. In this way, the displays are convenient and elegant in indoor applications, and it is unnecessary for the user to put a heavy cathode ray tube (CRT) display on a table.

In recent years, flexible displays are quickly developed. Since the flexible display can be curled to occupy a less space, it is easy to be carried around. Moreover, when the flexible display is used, it can be spread from a curling state to enter a planar state, so that a displayed image may have a large area, which increases an application level of the display.

However, in order to implement a man-machine interface suitable for situational uses and achieve more intuitive interaction, a plurality of sensors is configured on the flexible display, for example, touch sensors are configured on a display area of a flexible display panel in order to detect a touch operation of the user, and bending sensors are configured at edges (outside the display area) of the flexible display panel in order to detect whether the flexible display panel is bended by the user. However, configuration of different types of the sensors may increase cost of the flexible display. Therefore, how to use fewer types of the sensors to provide different operation modes is an important issue to be developed.

SUMMARY

The disclosure is directed to a flexible display, which is capable of providing a plurality of display modes.

The disclosure provides a method for controlling a flexible display, by which the flexible display is controlled to provide a plurality of display modes.

The disclosure provides a flexible display including a plurality of pressure sensors, a display unit, and a processing unit, wherein the processing unit is connected to the pressure sensors and the display unit. The processing unit obtains pressure values detected by each of the pressure sensors within a time unit, and generates a pressure area and a pressure variance according to the pressure values detected by each of the pressure sensors. The processing unit determines a display mode of the display unit according to the pressure area and the pressure variance.

The disclosure provides a method for controlling a flexible display. The method is described as follows. A plurality of pressure values detected by each of pressure sensors within a time unit is obtained. A pressure area and a pressure variance are generated according to the pressure values detected by each of the pressure sensors. A display mode of a display unit configured on the flexible display is determined according to the pressure area and the pressure variance.

According to the above descriptions, in the flexible display and controlling method thereof provided by the disclosure, the pressure area and the pressure variance can be calculated according to the pressure values detected by the pressure sensors configured on the flexible display. A plurality of different display modes is determined according to the pressure area and the pressure variance. In this way, as long as the pressure sensors are configured, the flexible display can provide different display modes, which reduces the cost. By configuring the pressure sensors, the user may have a more intuitive operation interface, for example, when the flexible display is bended, a flip operation is executed to facilitate the user browsing content of a next web page (or next page of E-book).

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
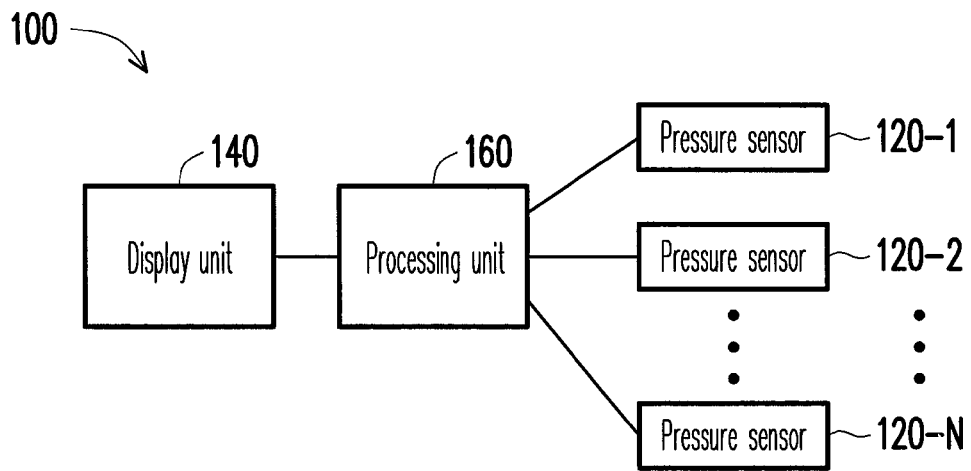
FIG. 1 is a block diagram of a flexible display according to an exemplary embodiment of the disclosure.

FIG. 1 is a block diagram of a flexible display 100 according to an exemplary embodiment of the disclosure. Referring to FIG. 1, the flexible display 100 includes a plurality of pressure sensors 120-1~120-N, a display unit (a flexible display panel) 140 and a processing unit 160. The pressure sensors 120-1~120-N are used for sensing a pressure. The larger the sustained pressure is, the larger a pressure value detected by the pressure sensors 120-1~120-N is. In the present exemplary embodiment, N pressure sensors are configured in the flexible display 100.

The display unit 140 is used to display information, and is suitable for being bended, which is, for example, an organic light emitting diode (OLED) panel, a flexible LCD panel, an electronic paper (E-paper) or other flexible display panels. The processing unit 160 is coupled to the pressure sensors 120-1~120-N and the display unit 140. The processing unit 160 receives pressure values from the pressure sensors 120-1~120-N, and calculates a corresponding display mode, so that the display unit 140 can execute the corresponding display mode. The processing unit 160 is, for example, a central processing unit (CPU) or a microprocessor, which can execute a program stored in a memory unit (not shown) to calculate the display mode. The memory unit can be configured in the processing unit 160 or can be configured in the flexible display 100 and coupled to the processing unit 160.

Figure 2:
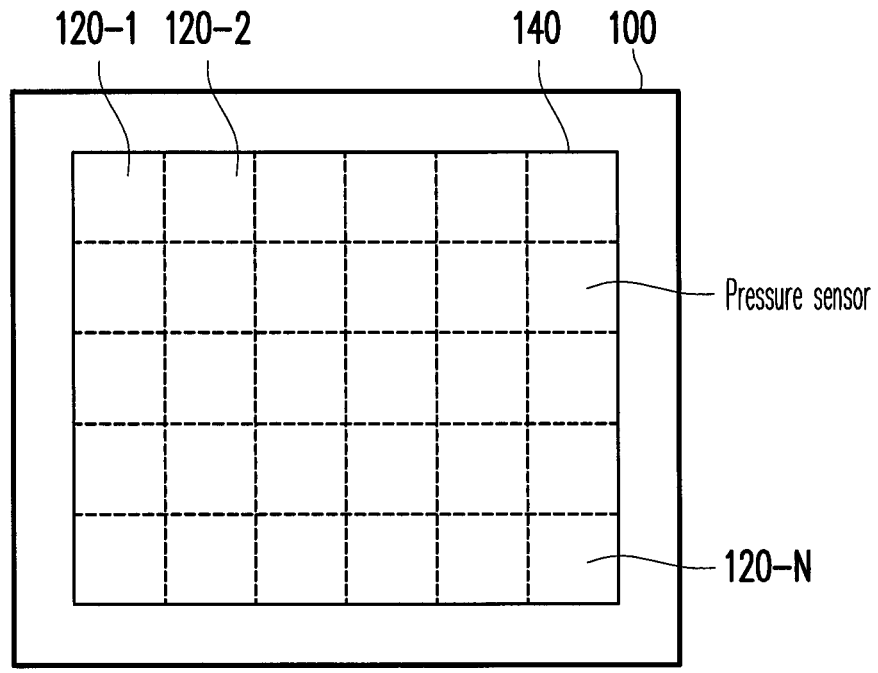
FIG. 2 is an appearance schematic diagram of the flexible display 100 according to an exemplary embodiment of the disclosure.

The pressure sensors 120-1~120-N can be disposed at any place on an outer surface of the flexible display 100. For example, the pressure sensors 120-1~120-N are disposed in a display area of the display unit 140. FIG. 2 is an appearance schematic diagram of the flexible display 100 according to an exemplary embodiment of the disclosure. In the present exemplary embodiment, the pressure sensors 120-1~120-N are distributed in the display area of the display unit 140 in an array for detecting pressures on corresponding positions. Therefore, the pressure sensors 120-1~120-N can detect a touch behaviour (touch event) of the user within the display area of the display unit 140. However, in other embodiments, the pressure sensors 120-1~120-N can also be partially or totally distributed outside the display unit 140. Distribution and arrangement of the pressure sensors 120-1~120-N are not limited by the disclosure.

Figure 3:
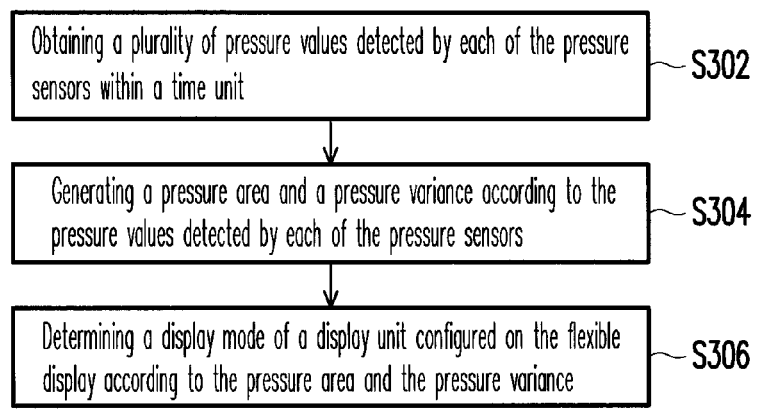
FIG. 3 is a flowchart illustrating a method for controlling a flexible display according to an exemplary embodiment of the disclosure.

The flexible display 100 of the disclosure can provide a corresponding display mode according to an operation (for example, a bending operation or a finger clicking operation) of the user performed on the flexible display 100. An operation method of the flexible display is described below with reference of FIG. 3. FIG. 3 is a flowchart illustrating a method for controlling a flexible display according to an exemplary embodiment of the disclosure. In step S302, the processing unit 160 obtains pressure values detected by each of the pressure sensors within a time unit. In an embodiment, the time unit is two seconds, though it can be longer or shorter, which is not limited by the disclosure. The number of the pressure values detected by the pressure sensor within the time unit can be different according to different implementations of the pressure sensor. For example, if each pressure sensor can detect 10 pressure values within two seconds, the processing unit 160 obtains 10 pressure values detected by each of the pressure sensors 120-1~120-N.

In step S304, the processing unit 160 generates a pressure area and a pressure variance according to the pressure values detected by the pressure sensors 120-1~120-N. The processing unit 160 generates the pressure area according to a distribution of the pressure sensors under pressure. The processing unit 160 calculates a pressure variation amount of the pressure values detected by each of the pressure sensors within the time unit, and averages the pressure variation amounts of all of the pressure sensors 120-1~120-N to obtain the pressure variance. In some other embodiments, the processing unit 160 calculates a pressure variation amount of the pressure values of each of the pressure sensors 120-1~120-N within the time unit, and averages the pressure variation amounts of some of the pressure sensors 120-1~120-N that are located in the pressure area to obtain the pressure variance. In still other embodiments, the processing unit 160 selects a representative pressure variation amount from the pressure variation amounts of some of the pressure sensors 120-1~120-N that are located in the pressure area to serve as the pressure variance. The representative pressure variation amount can be a maximum one of the pressure variation amounts.

Four examples are provided below to describe relationships of the pressure area and the pressure variance corresponding to different operations performed on the flexible display 100.

Figure 4:
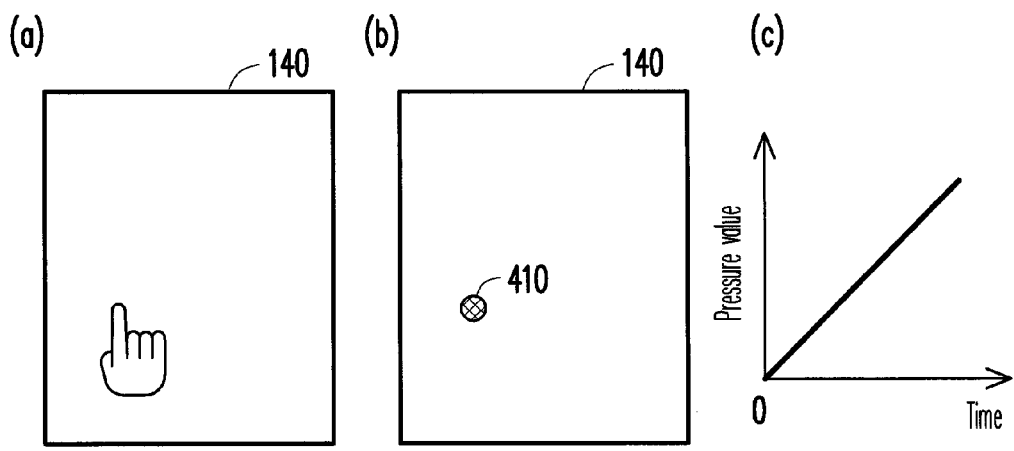
FIG. 4 is a pressure schematic diagram obtained when a finger clicks a display unit 140 according to an exemplary embodiment of the disclosure.

FIG. 4 is a pressure schematic diagram obtained when a finger clicks the display unit 140 according to an exemplary embodiment of the disclosure. Referring to FIG. 2 and FIG. 4, when the user clicks the display unit 140 by the finger (shown in (a) of FIG. 4), a contact area is only an area of the finger tip, and the pressure sensors distributed within a pressure region 410 (shown in (b) of FIG. 4) may sense a pressure of the finger, and the processing unit 160 generates the pressure area (i.e. an area of the pressure region 410) according to a size of the pressure region 410. On the other hand, the pressure sensors in the pressure region 410 have a large pressure variation amount within the time unit (shown in (c) of FIG. 4), so that the pressure variance obtained after the processing unit 160 averages the pressure variation amounts of all of the pressure sensors 120-1~120-N is also large. In other embodiments, the processing unit 160 calculates an average of the pressure variation amounts of the pressure sensors in the pressure region 410 to serve as the pressure variance of the display unit 140.

Figure 5:
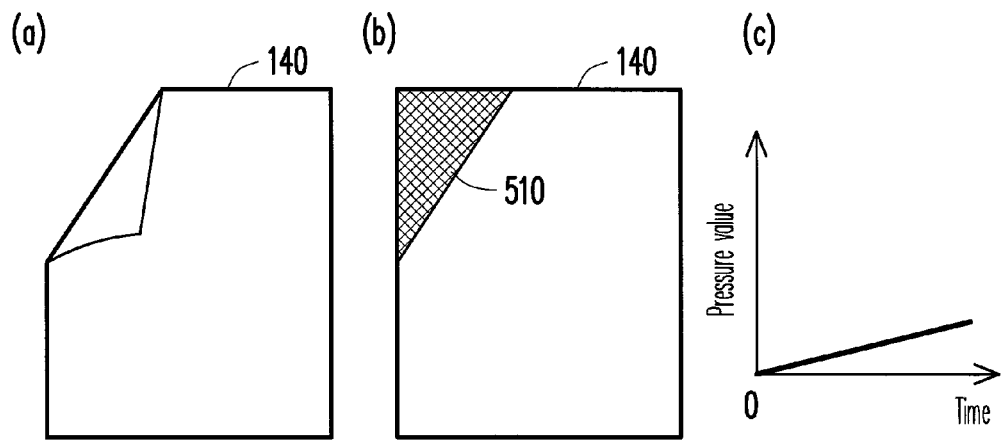
FIG. 5 is a pressure schematic diagram obtained when a display unit 140 is bended according to an exemplary embodiment of the disclosure.

FIG. 5 is a pressure schematic diagram obtained when the display unit 140 is bended according to an exemplary embodiment of the disclosure. Referring to FIG. 2 and FIG. 5, when the user bends the display unit 140 (shown in (a) of FIG. 5), the pressure sensors distributed in a pressure region 510 (shown in (b) of FIG. 5) sense a bending pressure, and the processing unit 160 calculates the pressure area according to a size of the pressure region 510. Compared to the situation of FIG. 4, when the display unit 140 is bended, the area of the pressure region 510 is obviously large. On the other hand, the pressure sensors in the pressure region 510 have a smaller pressure variation amount within the time unit (shown in (c) of FIG. 5), and the pressure variance obtained after the processing unit 160 averages the pressure variation amounts of all of the pressure sensors 120-1~120-N is also smaller.

Figure 6:
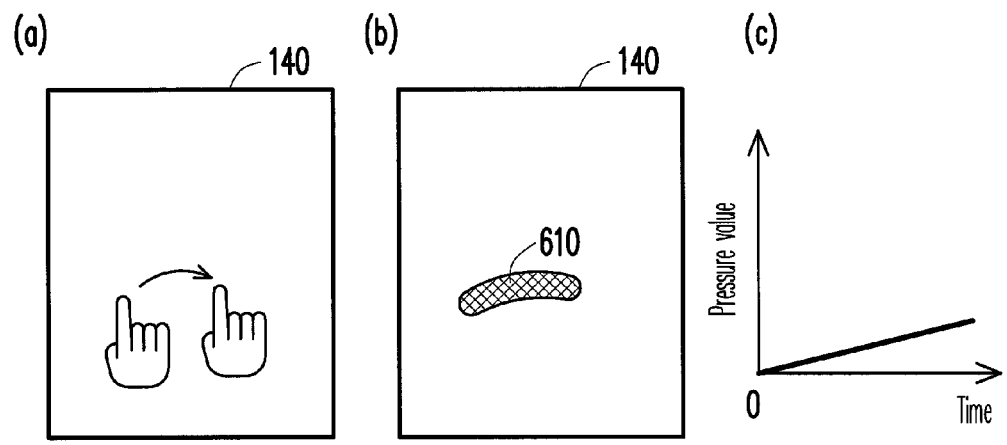
FIG. 6 is a pressure schematic diagram obtained when a display unit 140 is slightly flicked by a finger according to an exemplary embodiment of the disclosure.

FIG. 6 is a pressure schematic diagram obtained when the display unit 140 is slightly flicked by a finger according to an exemplary embodiment of the disclosure. Referring to FIG. 2 and FIG. 6, when the user slightly flicks the display unit 140 by a finger (shown in (a) of FIG. 6), the pressure sensors distributed within a pressure region 610 (shown in (b) of FIG. 6) may sense a pressure of the finger, and the processing unit 160 calculates the pressure area (i.e. an area of the pressure region 610) according to a size of the pressure region 610. On the other hand, the pressure sensors in the pressure region 610 have a smaller pressure variation amount within the time unit (shown in (c) of FIG. 6), so that the pressure variance obtained after the processing unit 160 averages the pressure variation amounts of all of the pressure sensors 120-1~120-N is also smaller. Compared to the situation of FIG. 4, the pressure variance generated when the finger slightly flicks the pressure region 610 of the display unit 140 is obviously smaller.

Figure 7:
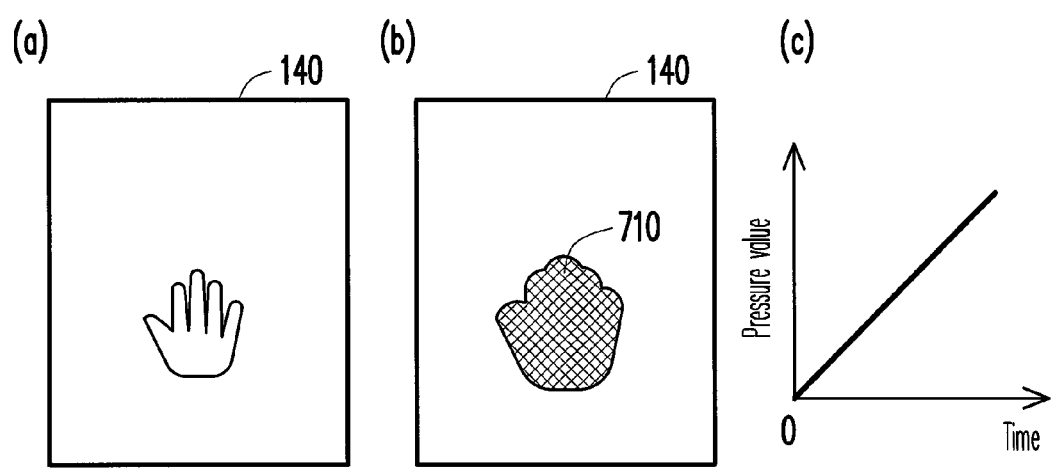
FIG. 7 is a pressure schematic diagram obtained when a display unit 140 is heavily pressed by a palm according to an exemplary embodiment of the disclosure.

FIG. 7 is a pressure schematic diagram obtained when the display unit 140 is heavily pressed by a palm according to an exemplary embodiment of the disclosure. Referring to FIG. 2 and FIG. 7, when the user heavily presses the display unit 140 by the palm (shown in (a) of FIG. 7), the pressure sensors distributed within a pressure region 710 (shown in (b) of FIG. 7) may sense a pressure of the palm, and the processing unit 160 calculates the pressure area according to a size of the pressure region 710. On the other hand, the pressure sensors in the pressure region 710 have a large pressure variation amount within the time unit (shown in (c) of FIG. 7), so that the pressure variance obtained after the processing unit 160 averages the pressure variation amounts of all of the pressure sensors 120-1~120-N is also large.

Referring to FIG. 3, in the step S306, the processing unit 160 determines a display mode of the display unit 140 configured on the flexible display 100 according to the generated pressure area and the pressure variance. In the present exemplary embodiment, the processing unit 160 compares the generated pressure variance with a first threshold value, and compares the generated pressure area with a second threshold value, and determines the display mode of the display unit 140 according to above comparison results. The first threshold value and the second threshold value can be defined by the user, or can be derived from statistical analysis after multiple operations, or can be obtained through a machine learning manner (for example, a support vector machine, a neural network).

In detail, when the pressure variance is greater than or equal to the first threshold value, and the pressure area is smaller than the second threshold value, the processing unit 160 determines the display mode of the display unit 140 as a "click mode" (shown in FIG. 4). The flexible display 100 provides the click mode to facilitate the user selecting a file displayed on the display unit 140 or activating an application program displayed on the display unit 140. It should be noticed that the click mode also includes a situation that multiple fingers click the display unit 140. The user can interact with a game or an application program through clicking operations of one or multiple fingers on the display unit 140.

When the pressure variance is smaller than the first threshold value, and the pressure area is greater than or equal to the second threshold value, the processing unit 160 determines the display mode of the display unit 140 as a "bending mode" (shown in FIG. 5). The flexible display 100 provides the bending mode to facilitate the user flipping a page of a browsing E-book or file, and the display unit 140 accordingly displays a previous page (or a next page) of the E-book or the file. The processing unit 160 determines to display the previous page or the next page according to a region bended by the user. For example, when an upper left corner or a lower left corner is bended, the processing unit 160 controls the display unit 140 to display the previous page of the E-book (or the file). Conversely, when an upper right corner or a lower right corner is bended, the processing unit 160 controls the display unit 140 to display the next page of the E-book (or the file). On the other hand, the user can zoom in/out a displayed image of the display unit 140 through the bending mode, or interact with a game or application software.

When the pressure variance is smaller than the first threshold value, and the pressure area is smaller than the second threshold value, the processing unit 160 determines the display mode of the display unit 140 as a "flick mode" (shown in FIG. 6). The flexible display 100 provides the flick mode to facilitate the user moving a picture or a displayed image of a web page, and the display unit accordingly displays different image regions. Alternatively, the user can move or copy a selected file through the flick mode.

When the pressure variance is greater than or equal to the first threshold value, and the pressure area is greater than or equal to the second threshold value, the processing unit 160 determines the display mode of the display unit 140 as a "heavy pressing mode" (shown in FIG. 7). The flexible display 100 provides the heavy pressing mode to facilitate the user interacting with a game or application software, or deleting a selected file.

However, in other exemplary embodiments of the disclosure, the processing unit 160 may determine the display mode of the display unit 140 according to different flows.

Figure 8:
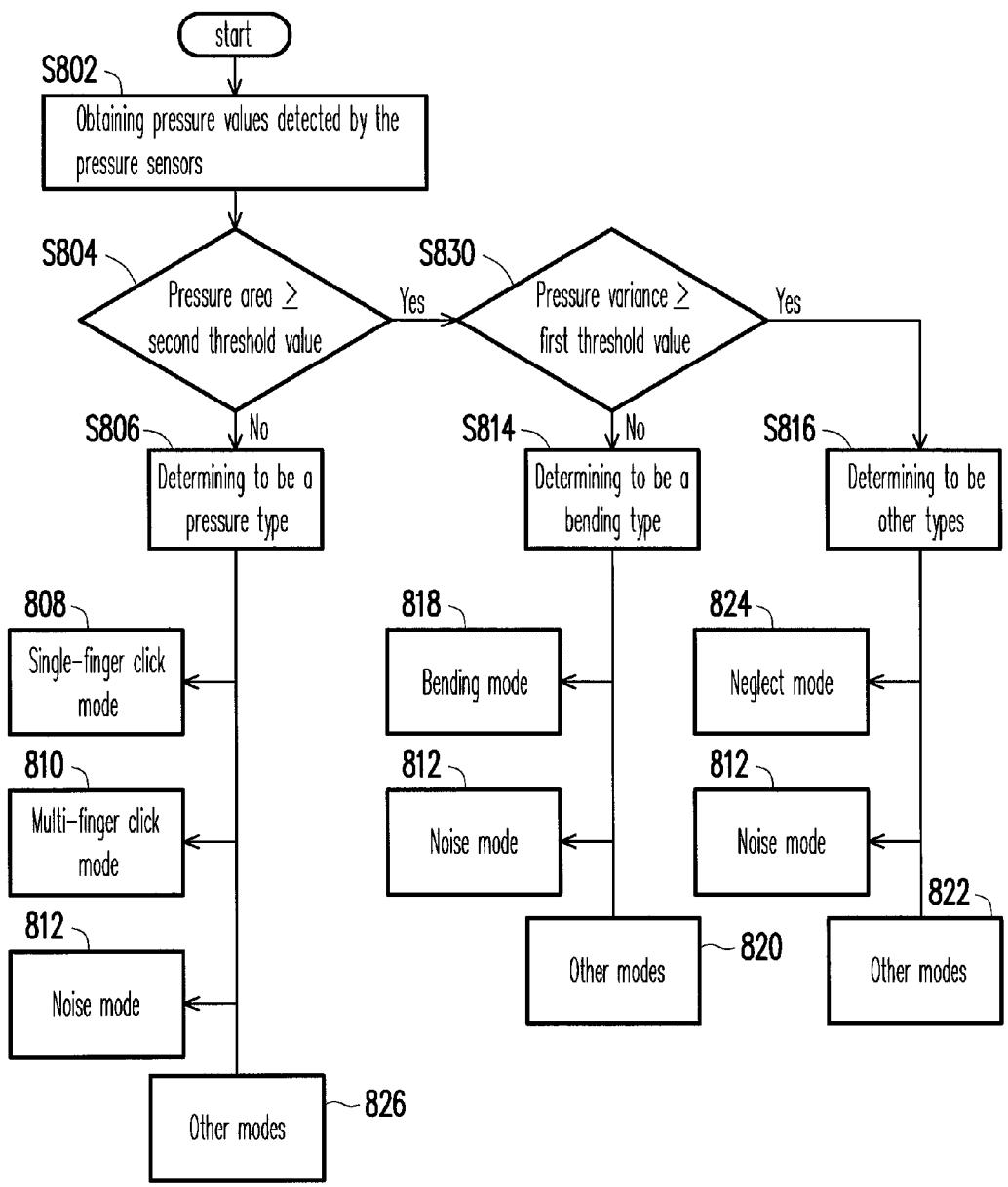
FIG. 8 is a flowchart illustrating a controlling method according to an exemplary embodiment of the disclosure.

FIG. 8 is a flowchart illustrating a controlling method according to an exemplary embodiment of the disclosure. Referring to FIG. 8, in step S802, the processing unit 160 obtains pressure values from each of the pressure sensors 120-1~120-N. Then, the processing unit 160 compares the pressure area with the second threshold value (step S804), where a calculation method of the pressure area has been described in detail in the aforementioned embodiment, and details thereof are not repeated. If the pressure area is smaller than the second threshold value, a pressure type display mode is determined (step S806), conversely, a step S830 is executed. In the step S806, the pressure type display mode includes a single-finger click mode 808, a multi-finger click mode 810, a noise mode 812 or other modes 826 satisfying the condition that the pressure area is smaller than the second threshold value. It should be noticed that before the pressure type display mode is determined, the processing unit 160 does not calculate the pressure variance, so as to save power consumption and time.

In step S830, the processing unit 160 compares the pressure variance with the first threshold value. If the pressure variance is smaller than the first threshold value, the processing unit 160 determines the current display mode as a bending type display mode (step S814), and otherwise, a step S816 is executed. The bending type display mode includes a bending mode 818, the noise mode 812 or other modes 820 satisfying the condition that the pressure area is greater than or equal to the second threshold value and the pressure variance is smaller than the first threshold value.

In step S816, the processing unit 160 determines the display mode of the display unit 140 to be the other type. The other type display mode includes a neglect mode 824, which represents that such display mode is not an operation event (for example, the heaving pressing mode of FIG. 7) concerned by the flexible display 100. The other type display mode also includes the noise mode 812 and other modes 822 satisfying the condition that the pressure area is greater than or equal to the second threshold value and the pressure variance is greater than or equal to the first threshold value.

On the other hand, in other embodiments of the disclosure, after the step S802, the step S830 can be executed first, and then the step S804 is executed. In this way, whether the display mode of the display unit 140 is the bending type display mode is determined only according to the pressure variance, which saves the power consumption and time for calculating the pressure area. A sequence of comparing the pressure area and the pressure variance is not limited by the disclosure.

In summary, according to the flexible display and the controlling method thereof provided by the disclosure, different display modes can be calculated only according to the pressure sensors, and since only one type of the pressure sensor is used, the cost of the flexible display is reduced.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for controlling a flexible display, wherein the flexible display comprises a plurality of pressure sensors, the method for controlling the flexible display comprising:
   obtaining a plurality of pressure values detected by each of the pressure sensors within a time unit;
   generating a pressure area and a pressure variance according to the pressure values detected by each of the pressure sensors;
   comparing the pressure variance with a first threshold value, comparing the pressure area with a second threshold value, and determining a display mode of a display unit configured on the flexible display according to comparison results;
   determining the display mode as a flick mode when the pressure variance is smaller than the first threshold value and the pressure area is smaller than the second threshold value;
   determining the display mode as a heavy pressing mode when the pressure variance is greater than or equal to the first threshold value and the pressure area is greater than or equal to the second threshold value;
   determining the display mode as a bending mode when the pressure variance is smaller than the first threshold value and the pressure area is greater than or equal to the second threshold value; and
   determining the display mode as a click mode when the pressure variance is greater than or equal to the first threshold value and the pressure area is smaller than the second threshold value.

2. The method for controlling the flexible display as claimed in claim 1, wherein the pressure sensors are disposed in a display area of the display unit.

3. The method for controlling the flexible display as claimed in claim 1, wherein the step of generating the pressure area and the pressure variance according to the pressure values detected by each of the pressure sensors comprises:
   calculating a plurality of pressure variation amounts of the pressure values detected by each of the pressure sensors within the time unit; and
   averaging the pressure variation amounts of the pressure sensors located in the pressure area to generate the pressure variance.

4. The method for controlling the flexible display as claimed in claim 1, wherein the step of generating the pressure area and the pressure variance according to the pressure values detected by each of the pressure sensors comprises:
   calculating a plurality of pressure variation amounts of the pressure values detected by each of the pressure sensors within the time unit; and
   selecting a representative pressure variation amount from the pressure variation amounts of the pressure sensors located in the pressure area to serve as the pressure variance.

5. The method for controlling the flexible display as claimed in claim 1, wherein the step of generating the pressure area and the pressure variance according to the pressure values detected by each of the pressure sensors comprises:
   generating the pressure area according to a distribution of the pressure sensors under pressure.

6. A flexible display, comprising:
   a plurality of pressure sensors;
   a display unit; and
   a processing unit, connected to the plurality of pressure sensors and the display unit,
   wherein the processing unit obtains pressure values detected by each of the pressure sensors within a time unit, generates a pressure area and a pressure variance according to the pressure values detected by each of the pressure sensors, compares the pressure variance with a first threshold value, compares the pressure area with a second threshold value, and determines a display mode of the display unit according to comparison results,
   wherein the processing unit determines the display mode as a flick mode when the pressure variance is smaller than the first threshold value and the pressure area is smaller than the second threshold value,
   wherein the processing unit determines the display mode as a heavy pressing mode when the pressure variance is greater than or equal to the first threshold value and the pressure area is greater than or equal to the second threshold value,
   wherein the processing unit determines the display mode as a bending mode when the pressure variance is smaller than the first threshold value and the pressure area is greater than or equal to the second threshold value,
   wherein the processing unit determines the display mode as a click mode when the pressure variance is greater than or equal to the first threshold value and the pressure area is smaller than the second threshold value.

7. The flexible display as claimed in claim 6, wherein the pressure sensors are disposed in a display area of the display unit.

8. The flexible display as claimed in claim 6, wherein the processing unit calculates a plurality of pressure variation amounts of the pressure values detected by each of the pressure sensors within the time unit, and averages the pressure variation amounts of the pressure sensors to generate the pressure variance.

9. The flexible display as claimed in claim 6, wherein the processing unit calculates a plurality of pressure variation amounts of the pressure values detected by each of the pressure sensors within the time unit, and selects a representative pressure variation amount from the pressure variation amounts of the pressure sensors located in the pressure area to serve as the pressure variance.

10. The flexible display as claimed in claim 6, wherein the processing unit generates the pressure area according to a distribution of the pressure sensors under pressure.

* * * * *